(12) United States Patent
Heimrath et al.

(10) Patent No.: US 10,967,780 B2
(45) Date of Patent: Apr. 6, 2021

(54) MOTOR VEHICLE

(71) Applicant: Bayerische Motoren Werke Aktiengesellschaft, Munich (DE)

(72) Inventors: Michael Heimrath, Fuerstenfeldbruck (DE); Tobias Koegel, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/219,309

(22) Filed: Dec. 13, 2018

(65) Prior Publication Data

US 2019/0126810 A1 May 2, 2019

Related U.S. Application Data

(63) Continuation of application No. PCT/EP2017/061788, filed on May 17, 2017.

(30) Foreign Application Priority Data

Jun. 16, 2016 (DE) ...................... 10 2016 210 718.6

(51) Int. Cl.
*B60Q 1/08* (2006.01)
*B60Q 1/00* (2006.01)
(Continued)

(52) U.S. Cl.
CPC .......... *B60Q 1/085* (2013.01); *B60Q 1/0023* (2013.01); *B60Q 1/0041* (2013.01);
(Continued)

(58) Field of Classification Search
CPC .............. B62K 2207/02; B60Q 1/0425; B60Q 1/0441; B60Q 1/045; B60Q 1/06;
(Continued)

(56) References Cited

U.S. PATENT DOCUMENTS 3,939,339 A * 2/1976 Alphen ................. B60Q 1/076
362/467
4,204,270 A 5/1980 Poirier d'Ange d'Orsay
(Continued)

FOREIGN PATENT DOCUMENTS

CN 1487889 A 4/2004
DE 27 42 271 A1 3/1978
(Continued)

OTHER PUBLICATIONS

International Search Report (PCT/ISA/210) issued in PCT Application No. PCT/EP2017/061788 dated Aug. 14, 2017 with English translation (five (5) pages).
(Continued)

*Primary Examiner* — Alexander K Garlen
*Assistant Examiner* — Colin J Cattanach
(74) *Attorney, Agent, or Firm* — Crowell & Moring LLP

(57) ABSTRACT

A single-track motor vehicle or a multi-track motor vehicle with tilt technology, includes one or more environment sensors that are installed in the front of the motor vehicle and that are arranged for detecting an area in front of the motor vehicle, and a control unit. The control unit controls an actuator while the motor vehicle is travelling depending on the position of the motor vehicle that is detected by the position sensor system in such a way that when the motor vehicle is tilted along a plane perpendicular to the longitudinal axis thereof, the movable element is moved by means of the actuator so that the position of a respective environment sensor is not rotated relative to the longitudinal axis of the motor vehicle when the motor vehicle is tilted compared to the position of the respective environment sensor when the motor vehicle is not tilted.

10 Claims, 3 Drawing Sheets

(51) Int. Cl.
    *G01S 15/931*     (2020.01)
    *G01S 7/497*     (2006.01)
    *G01S 17/931*     (2020.01)
    *G01S 7/40*     (2006.01)
    *G01S 13/931*     (2020.01)
    *B62J 45/415*     (2020.01)

(52) U.S. Cl.
    CPC .......... *G01S 7/4026* (2013.01); *G01S 7/4972* (2013.01); *G01S 15/931* (2013.01); *G01S 17/931* (2020.01); *B60Q 2300/132* (2013.01); *B60Q 2300/134* (2013.01); *B60Y 2400/3015* (2013.01); *B62J 45/4151* (2020.02); *G01S 2007/4034* (2013.01); *G01S 2013/93277* (2020.01)

(58) Field of Classification Search
    CPC .... B60Q 1/068; B60Q 1/0683; B60Q 1/0686; B60Q 1/076; B60Q 1/08; B60Q 1/085; B60Q 1/10; B60Q 1/11; B60Q 1/115; B60Q 1/122; B60Q 1/124; G01S 2013/93277

See application file for complete search history.

(56) References Cited

U.S. PATENT DOCUMENTS

| | | | | |
|---|---|---|---|---|
| 5,412,543 | A * | 5/1995 | Kobayashi | B60Q 1/12 362/524 |
| 5,426,571 | A * | 6/1995 | Jones | B60Q 1/115 362/286 |
| 8,511,872 | B2 * | 8/2013 | Schmidt | B60Q 1/12 362/37 |
| 8,738,235 | B2 * | 5/2014 | Laliron | B60Q 1/0023 348/118 |
| 9,114,754 | B2 * | 8/2015 | Ehlgen | B60Q 1/10 |
| 9,150,266 | B1 * | 10/2015 | Jones | B62J 6/02 |
| 2003/0122704 | A1 | 7/2003 | Dubrovin | |
| 2008/0013331 | A1 * | 1/2008 | Tseng | B60Q 1/076 362/465 |
| 2010/0182432 | A1 | 7/2010 | Augst | |
| 2012/0044708 | A1 * | 2/2012 | Schmidt | B60Q 1/12 362/466 |
| 2014/0247349 | A1 * | 9/2014 | Heard | B60Q 1/0023 348/148 |
| 2014/0321132 | A1 * | 10/2014 | Shibata | B60Q 1/0683 362/460 |
| 2015/0329072 | A1 | 11/2015 | Freienstein et al. | |
| 2016/0339834 | A1 * | 11/2016 | Oshima | F21S 41/29 |
| 2017/0225735 | A1 * | 8/2017 | Saez Lopez | B60Q 1/068 |
| 2017/0267162 | A1 * | 9/2017 | Remillard | B60Q 1/0023 |

FOREIGN PATENT DOCUMENTS

| | | | |
|---|---|---|---|
| DE | 602 04 534 T2 | 3/2006 | |
| DE | 102005055087 A1 * | 5/2007 | .......... B60Q 1/0023 |
| DE | 10 2007 044 536 A1 | 3/2009 | |
| DE | 10 2012 221 188 A1 | 5/2014 | |
| DE | 10 2013 216 584 A1 | 2/2015 | |
| EP | 1201498 A1 * | 5/2002 | .......... B60Q 1/0023 |
| EP | 1942049 A2 * | 7/2008 | .......... B60Q 1/115 |
| EP | 2 138 349 A2 | 12/2009 | |
| WO | WO-2012022658 A1 * | 2/2012 | ............ B60Q 1/076 |

OTHER PUBLICATIONS

German-language Written Opinion (PCT/ISA/237) issued in PCT Application No. PCT/EP2017/061788 dated Aug. 14, 2017 (seven (7) pages).
German Search Report issued in counterpart German Application No. 10 2016 210 718.6 dated Feb. 24, 2017 (13 pages).
English translation of Chinese language Office Action issued in Chinese Application No. 201780015024.6 dated Nov. 24, 2020 (nine (9) pages).

* cited by examiner

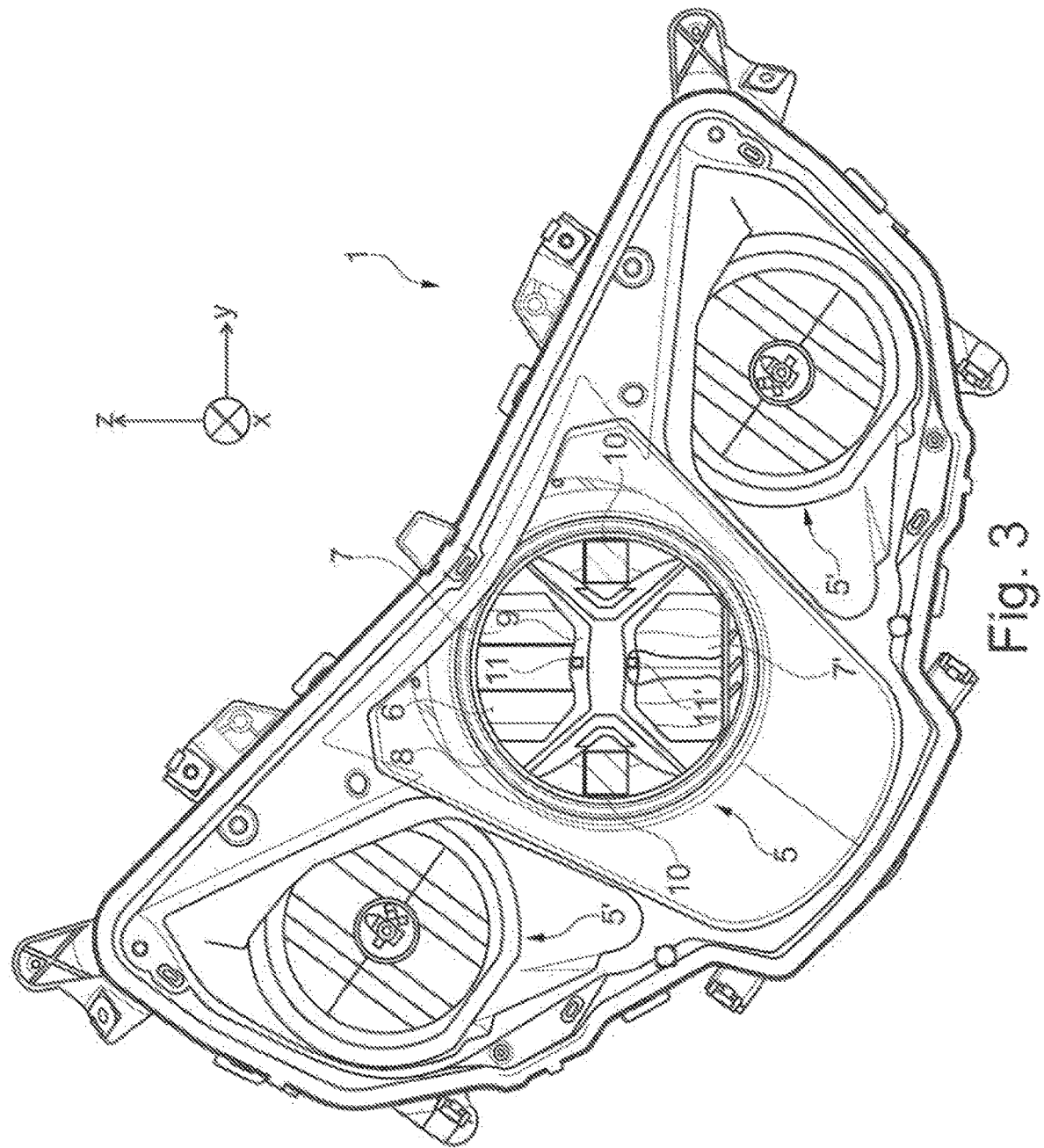

MOTOR VEHICLE

CROSS REFERENCE TO RELATED APPLICATIONS

This application is a continuation of PCT International Application No. PCT/EP2017/061788, filed May 17, 2017, which claims priority under 35 U.S.C. § 119 from German Patent Application No. 10 2016 210 718.6, filed Jun. 16, 2016, the entire disclosures of which are herein expressly incorporated by reference.

BACKGROUND AND SUMMARY OF THE INVENTION

The embodiments of the invention concern a motor vehicle, in which the motor vehicle is a single-track motor vehicle, such as for example a motor cycle, or a multi-track and in particular a two-track motor vehicle with tilt technology. A motor vehicle with tilt technology is characterized in that when turning the motor vehicle tilts about the longitudinal axis thereof similarly to a single-track vehicle.

Environment sensor systems have been installed in motor vehicles and inter alia also in single-track motor vehicles, in order to detect objects or road users that are in front of the motor vehicle. Said environment sensor systems are used in combination with a driver assistance system as a rule, for example with an active speed controller that adjusts the speed of the motor vehicle so that a distance from a road user ahead is not undershot.

The use of environment sensor systems in single-track or multi-track motor vehicles with tilt technology has the disadvantage that the region in front of the motor vehicle detected by the sensor system tilts when in the inclined position while turning, whereby the field of view of the environment sensor system on the outside of the turn is significantly restricted.

For instance, headlamp systems for motor cycles are can rotate about the longitudinal axis of the motor cycle. An example of a headlamp of this type is described in the document DE 10 2013 216 584 A1. Headlamps of this type can be used in combination with a position sensor system of the motor cycle so that the tilt of the light distribution produced with the headlamp with the motor cycle in an inclined position is compensated by suitable rotation of the headlamp, and thus the area of road in front of the motor cycle is always optimally illuminated.

It is one object of the embodiments of the invention to provide a single-track motor vehicle or a multi-track motor vehicle with tilt technology, with which the functionality of an environment sensor system installed in the motor vehicle is improved.

This object is achieved by an inventive single-track motor vehicle, such as a motor cycle, or a multi-track and preferably two-track motor vehicle with tilt technology. The inventive motor vehicle comprises one or more environment sensors that are installed in the front of the motor vehicle and are arranged for detecting an area in front of the front of the motor vehicle. The environment sensor(s) is/are (mechanically) rigidly connected to a movable element installed in the motor vehicle, which can be moved by means of an actuator of the motor vehicle by turning and/or pivoting. A control unit for controlling the actuator and a position sensor system for detecting the spatial position of the motor vehicle are also provided in the motor vehicle.

The control unit is designed to control the actuator while the motor vehicle is being driven depending on the position of the motor vehicle that is detected by the position sensor system in such a way that when the motor vehicle is tilted along a plane perpendicular to the longitudinal axis thereof, the movable element is moved by means of the actuator so that the position of a respective environment sensor (i.e. any environment sensor) is not rotated relative to the longitudinal axis of the motor vehicle when the motor vehicle is tilted compared to the position of the respective environment sensor when the motor vehicle is not tilted. In other words, the change in the position of the respective environment sensor between the upright position and the tilted position of the motor vehicle can be described purely by a translation in the plane perpendicular to the longitudinal axis.

The inventive motor vehicle is thus characterized in that the tilt of a movable element or of the associated environment sensor that is caused by the tilt of the motor vehicle can be compensated by suitable movement of the movable element by means of the actuator. The term tilt or even the terms mentioned further below for tilting about the lateral axis or rotating about the vertical axis always relate to a corresponding change in position compared to the upright position of the motor vehicle that the vehicle adopts when travelling in a straight line. In the upright position, the vertical axis of the motor vehicle runs parallel to the direction of gravity and the longitudinal axis thereof corresponds to the direction of travel of the motor vehicle.

The inventive motor vehicle has the advantage that a detection region of an environment sensor system designed for travelling in a straight line is maintained even when the motor vehicle is tilted while turning and rotation of the detection region does not occur, so that the outside of the turn can be detected by the environment sensor system. A further advantage of the inventive motor vehicle is that environment sensors developed for conventional motor vehicles without tilt technology and the analysis software thereof, which are designed for a position horizontal to the road without tilt, can also be widely adopted in single-track motor vehicles or motor vehicles with tilt technology.

In the inventive motor vehicle, in addition to the environment sensors described above, which are rigidly connected to a movable element, further environment sensors may also be installed that are not movable are or that are rigidly connected to another movable element. However, all environment sensors in the motor vehicle are preferably rigidly connected to a corresponding movable element, in order to be moved when the motor vehicle is tilted in such a way that the orientation thereof does not vary in relation to the orientation thereof when the motor vehicle is in the upright position.

A sensor or a combination of sensors can be used as the position sensor system in the motor vehicle according to the invention. The sensors can for example operate capacitively or by means of a gyroscope.

In the inventive motor vehicle, the controller may be designed so as to further control the actuator during operation of the motor vehicle depending on the position of the motor vehicle that is detected by the position sensor system, so that when the motor vehicle is tilted about the lateral axis thereof, the movable element is moved in the opposite direction to the tilting so that a respective environment sensor is tilted by the magnitude of the tilting angle. In this way, in addition to the tilt, a pitching movement of the motor vehicle during acceleration or braking can be compensated.

In the inventive motor vehicle, the control unit may be designed to further control the actuator while the motor vehicle is operating depending on the position of the motor vehicle that is detected by the position sensor system, so that in the event of rotation of the motor vehicle about the vertical axis thereof, the movable element is rotated so that a respective environment sensor is rotated by the magnitude of the angle of the rotation in the opposite direction to the rotation.

In the inventive motor vehicle, the movable element may be installed in a headlamp module in the front of the motor vehicle. In particular, the movable element is a movable optical device of a headlamp of the headlamp module, whereby the light distribution produced by the headlamp is moved by means of the actuator in the same way as the environment sensor(s). By this means, in addition to good detection of the surroundings by means of the environment sensor system, at the same time good illumination of the road is achieved by means of the corresponding component during tilting or possibly also during other inclined positions of the motor vehicle.

The environment sensor(s) may be disposed in the housing of the headlamp containing the movable optical device. As a result of this, compact accommodation of the environment sensors is guaranteed. Depending on the design, the movable optical device can comprise various elements of the headlamp, in particular one or more light sources, such as for example LEDs, and/or a projection optics and/or reflection optics.

The environment sensors installed in the motor vehicle can be based on any technologies known from the prior art. In particular, the environment sensor(s) can comprise one or more camera and/or one or more ultrasonic sensors and/or one or more radar units and/or one or more Lidar units.

In a further version, the inventive motor vehicle may be designed so as to determine the course of the road ahead, in which the control unit further controls the actuator while the motor vehicle is travelling depending on said course of the road such that the movable element is moved by means of the actuator so that the regions detected by the respective environment sensors move into the turn when a turn occurs in the course of the road. Said movement into the turn is preferably already carried out before the motor vehicle is tilted in the turn. With said version, the functionality of a cornering light is achieved in the motor vehicle, which illuminates into the turn.

The inventive motor vehicle may be designed so as to determine the course of the road ahead by determining the position thereof by means of satellite-based location and matching said position with a digital street map. In this case, the street map can be contained in the motor vehicle, or the motor vehicle can call up the map from a server by means of a suitable communications device. Alternatively or additionally, the inventive motor vehicle can determine the course of the road by receiving digital data describing the course of the road via Car-to-X communications. Information can be transmitted to vehicles from other vehicles or from a traffic infrastructure (such as for example traffic lights) using said communications.

BRIEF DESCRIPTION OF THE DRAWINGS

Other objects, advantages and novel features of the present invention will become apparent from the following detailed description of one or more preferred embodiments when considered in conjunction with the accompanying drawings, in which:

FIG. 3 is a plan view of the headlamp module of FIG. 2 in an inclined position when turning to the left.

DETAILED DESCRIPTION OF THE DRAWINGS

Figure 1:
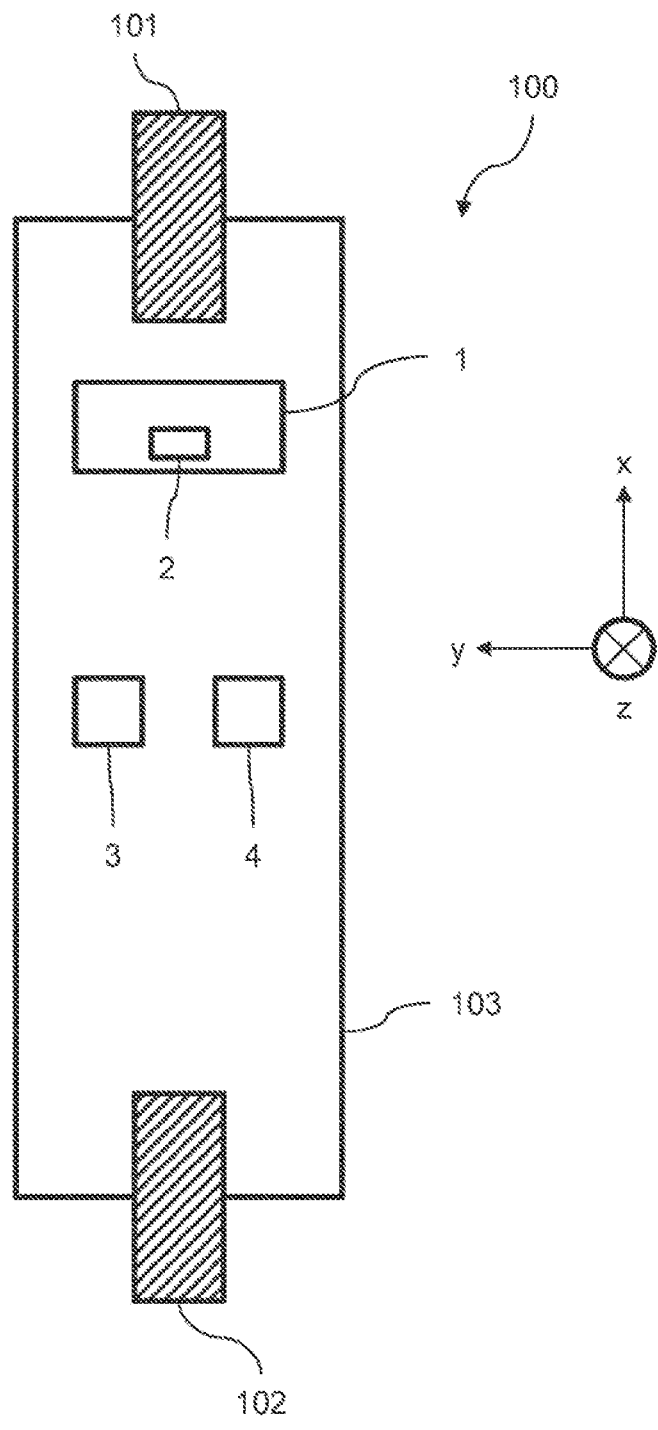
FIG. 1 is a schematic representation of an inventive motor cycle.

An embodiment of an inventive motor vehicle is described below using a single-track motor vehicle in the form of a motor cycle. FIG. 1 shows highly schematically the plan view from above of the motor cycle, which is denoted by reference character 100 and which is driving in a straight line in the upright position. The motor cycle comprises a front wheel 101 and a rear wheel 102. The longitudinal axis corresponds to the axis x of the represented coordinate system. By contrast, the lateral direction of the motor cycle runs in the direction of they axis of the coordinate system and the vertical axis of the motor cycle runs in the direction of the z axis. The frame of the motor cycle is indicated schematically as a rectangle and denoted by the reference character 103. On the front of the motor cycle, there is a headlamp module 1, the design of which is described in detail using FIG. 2 and FIG. 3. The central headlamp of the module comprises the actuator 2 that is schematically indicated in FIG. 1, with which the headlamp is pivoted during a turn so that it maintains a horizontal position even when the motor cycle is tilted in a turn.

A position sensor system 3 is provided on the frame of the motor cycle 100, with which the orientation of the longitudinal axis, lateral axis and vertical axis of the motor cycle can be detected. The position sensor system 3 is based on known technologies and can detect the position of the motor cycle, for example capacitively and/or by means of a gyroscope. Furthermore, a control unit 4 with which different functionalities of the motor cycle are controlled is provided in the motor cycle 100. In the embodiment described here, said control unit also carries out the control of the actuator 2.

Figure 2:
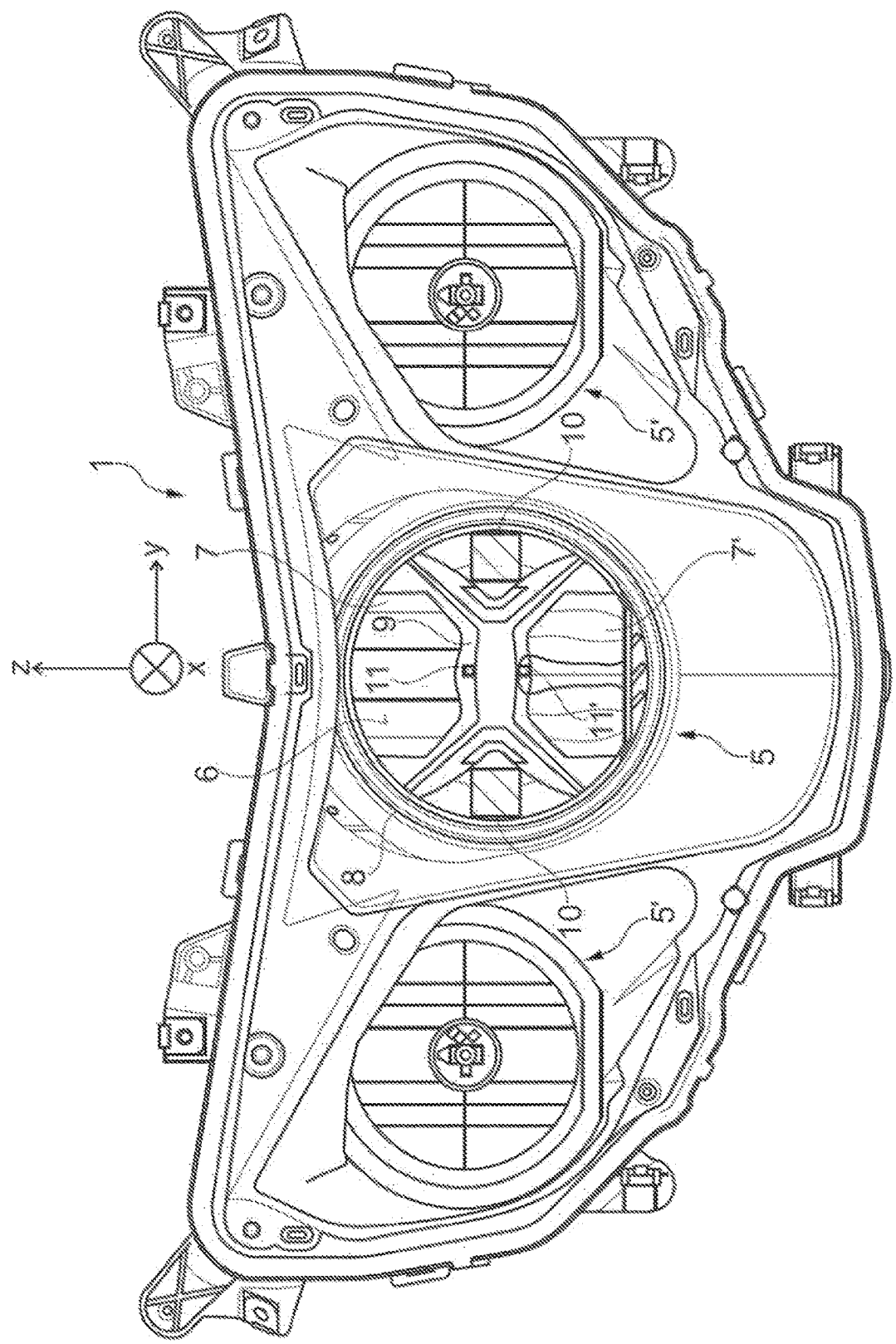
FIG. 2 is a top view of the headlamp module of the motor cycle from FIG. 1 in the upright position when travelling in a straight line.

The motor cycle further comprises an environment sensor system that is shown in FIGS. 2 and 3 and that is installed in the headlamp module 1. The analysis of the data of the environment sensor system is also carried out by means of the control unit 4 in the embodiment described here. The environment sensor system is used in combination with a driver assistance system to detect the distance of the motor cycle from objects or vehicles ahead and to automatically control said distance or to automatically adjust the speed the motor cycle accordingly.

The motor cycle 100 of FIG. 1 changes the orientation thereof in space while travelling. When turning, the motor cycle tilts about the longitudinal axis, i.e. the motor cycle tilts along a plane perpendicular to the longitudinal axis. Said movement is often also referred to as rolling. Moreover, while the motor cycle is travelling, the orientation of the longitudinal axis thereof also changes so as to rotate about the lateral axis. Said movement is also referred to as so-called pitching and occurs inter alia during braking and accelerating. Moreover, the longitudinal axis also rotates about the vertical axis when turning. Said movement occurs during oversteer or understeer and is also referred to as yawing.

The tilt of the light distribution produced by the headlamp module 1 during a turn is compensated by means of the actuator 2 by a corresponding opposite movement of one of the headlamps by the actuator 2. At the same time the tilt of the detection region of the environment sensor system is also compensated, as is described further below using FIG. 2 and FIG. 3. Moreover, a pitching movement of the light distribution, and correspondingly also the pitching movement of the environment sensor system, are compensated with the actuator 2.

FIG. 2 shows a top view of the headlamp module 1 of FIG. 1. The module comprises a central headlamp 5 and a right and a left headlamp 5'. The central headlamp 5 is used to produce both the dimmed light distribution and the high beam light distribution of the motor cycle. When switching on the high beam, the two headlamps 5' can also be added. The central headlamp 5 comprises a housing 8, in which there is an optical device 6. Said optical device comprises an upper freeform reflector 7 and a lower freeform reflector 7'. Behind an X-shaped aperture 9 there is an upper LED unit 11 that radiates onto the free space reflector 7, and a lower LED unit 11' that radiates onto the freeform reflector 7'. The LED units 11 and 11' are only indicated schematically by black squares. By switching on the LED unit 11, the dimmed beam of the headlamp module is activated, whereas by switching on the LED unit 11', the high beam is activated. The optical device 6 can be pivoted both about the longitudinal axis x and about the lateral axis y by means of the actuator 2, which cannot be seen in FIG. 2. In this case, the actuator 2 is controlled by means of the control unit 4 such that in the event of the detection of tilting of the motor cycle or a pitching movement of the motor cycle, said tilting or pitching movement is compensated by opposite movement of the optical device 6, as is described in detail further below using FIG. 3.

The aforementioned environment sensor system is now additionally installed in the headlamp 5 of the headlamp module 1. In the example of FIG. 2, two environment sensors 10 are provided, which are only schematically indicated as hashed squares. As installation space for said environment sensors, the space to the left and right beside the X-shaped aperture 9 is used, which has not previously been used for technical devices. In this case, the environment sensors are rigidly connected to the optical device 6, i.e. they carry out the same movement as the optical device 6. Depending on the design, the environment sensors 10 can be cameras, ultrasonic sensors, radar sensors, lidar sensors and similar. In the case of a radar sensor or a lidar sensor, for example the radar/lidar transmitter can be disposed in the installation space on the left of the aperture 9 and the radar/lidar receiver can be disposed in the installation space to the right thereof (or vice-versa). By installing the environment sensor system in a movable element of the headlamp, it is achieved that with the motor cycle in an inclined position, the horizontal position of the region detected by the sensor system does not vary compared to the position thereof when the motor cycle is in the upright position. As a result of this, it is ensured that the region detected with the environment sensor system does not tilt during a turn and thus the field of view on the outside of the turn is not limited, which is the case when the environment sensor system is installed in a non-movable component in the front of the motor cycle.

FIG. 3 shows the headlamp module 1 of FIG. 2 when tilted, when the motor cycle is in a left turn. As can be seen, all components of the headlamp module with the exception of the optical device 6 tilt in this case. This is achieved by detecting the inclined position of the motor cycle by means of the position sensor system 3 and the control unit 4 controlling the actuator 2 such that the optical device is rotated oppositely to the tilting direction, i.e. in the case of FIG. 3 oppositely to the clockwise direction, to the same extent as the motor cycle is inclined. The rotation thus corresponds to the angle of the inclined position. With the headlamp switched on, the effect of this is that even during a turn the region of the road ahead is illuminated as well as possible. In addition, the optimal detection of the area in front of the motor cycle by means of the environment sensor system is guaranteed, because this results from the rigid connection of the movement of said device to the optical device 6.

As already mentioned above, a pitching movement is compensated in the headlamp module according to FIG. 2 and FIG. 3. This is carried out during rotation of the longitudinal axis in the upward or downward direction about the lateral axis by tilting the optical device 6 in the corresponding opposite direction by means of the actuator 2. This is again achieved by means of the control unit 4, wherein in this case the control unit accesses the position sensor system 3 that detects the pitching movement. Owing to the rigid connection of the environment sensor system 10 to the optical device 6, in this case the pitching movement is not only compensated for the headlamp 5, but also for the environment sensor system 10. In modified embodiments moreover, it is possible that even the yawing described is compensated by the movement of the optical device of the headlamp. The movements of the optical device 6 described above are both carried out with the headlamp 5 switched on and switched off, so that optimal detection of the surroundings by the environment sensor system is also guaranteed during the day when the headlamp is switched off.

The embodiments of the invention described above have a series of advantages. In particular, connecting an environment sensor system to a movable element of a headlamp ensures that the detected region of the environment sensor system is always horizontal to the road. Thus, an optimal window of view of the sensor system is fully retained. As environment sensor systems have as a rule been developed for motor vehicles without tilt technology, said sensor systems can also be adopted substantially without adaptation for motor vehicles with tilt technology. Moreover, in addition to an optimal viewing window of the environment sensor system, optimal illumination of the area in front of the motor cycle by means of the headlamp thereof is guaranteed.

REFERENCE CHARACTER LIST

|  |  |
|---|---|
|  | motor cycle |
|  | front wheel of the motor cycle |
|  | rear wheel of the motor cycle |
|  | frame of the motor cycle |
|  | headlamp module |
|  | actuator |
|  | position sensor system |
|  | control unit |
| 5, 5' | headlamps |
| 6 | optical device |
| 7, 7' | freeform reflectors |
|  | housing |
|  | aperture |
|  | environment sensors |
| 11, 11' | light sources/LED units |
| x | longitudinal axis of the motor cycle |
| y | lateral axis of the motor cycle |
| z | vertical axis of the motor cycle |

The foregoing disclosure has been set forth merely to illustrate the embodiments of the invention and is not intended to be limiting. Since modifications of the disclosed embodiments incorporating the spirit and substance of the invention may occur to persons having ordinary skill in the art, the invention should be construed to include everything within the scope of the appended claims and equivalents thereof.

What is claimed is:

1. A motor vehicle, comprising:
one or more environment sensors that are installed in a headlamp module on the front of the motor vehicle and that are arranged for detecting an area in front of the motor vehicle, wherein
the one or more environment sensors are rigidly connected to a movable element that can be moved by means of an actuator by turning and/or pivoting,
a control unit configured to control the actuator and a position sensor system configured to detect the position of the motor vehicle in space are provided in the motor vehicle,
the control unit controls the actuator while the motor vehicle is travelling depending on the position of the motor vehicle that is detected by the position sensor system in such a way that when the motor vehicle is tilted along a plane perpendicular to the longitudinal axis thereof, the movable element is moved by means of the actuator so that the position of a respective environment sensor is not rotated relative to the longitudinal axis of the motor vehicle when the motor vehicle is tilted compared to the position of the respective environment sensor when the motor vehicle is not tilted,
the motor vehicle is a single-track motor vehicle or a multi-track motor vehicle with tilt technology,
the headlamp module includes a first region that is rigid, and a second region that moves relative to the first region, and
the one or more environment sensors are disposed in the first region of the headlamp module.

2. The motor vehicle as claimed in claim 1, wherein the control unit also controls the actuator while the motor vehicle is operating depending on the position of the motor vehicle that is detected by the position sensor system in such a way that in the case of tilting of the motor vehicle about a lateral axis thereof, the movable element is moved so that a respective environment sensor is tilted by the magnitude of the angle of tilt in the opposite direction to the tilting.

3. The motor vehicle as claimed in claim 2, wherein the control unit further controls the actuator while the motor vehicle is operating depending on the position of the motor vehicle that is detected by the position sensor system in such a way that in the event of rotation of the motor vehicle about a vertical axis thereof, the movable element is moved so that a respective environment sensor is rotated by the magnitude of the angle of rotation in the opposite direction to the rotation.

4. The motor vehicle as claimed in claim 3, wherein the movable element is installed in the headlamp module in the front of the motor vehicle.

5. The motor vehicle as claimed in claim 4, wherein the movable element is a movable optical device of a headlamp of the headlamp module, whereby the light distribution that is produced with the headlamp is moved by means of the actuator in the same way as the one or more environment sensors.

6. The motor vehicle as claimed in claim 5, wherein the one or more environment sensors are disposed in the housing of the headlamp that comprises the movable optical device.

7. The motor vehicle as claimed in claim 6, wherein the movable optical device comprises one or more light sources and/or projection optics and/or reflection optics.

8. The motor vehicle as claimed in claim 7, wherein the one or more environment sensors include one or more cameras and/or one or more ultrasonic sensors and/or one or more radar units and/or one or more lidar units.

9. The motor vehicle as claimed in claim 8, wherein the motor vehicle is designed so as to determine the course of the road ahead, the control unit also controls the actuator while the motor vehicle is travelling depending on said course of the road in such a way that the movable element is moved by means of the actuator so that the regions detected by the respective environment sensors move into the turn when a turn occurs in the course of the road.

10. The motor vehicle as claimed in claim 9, wherein the motor vehicle is designed so as to determine the course of the road ahead by determining the position thereof by means of satellite-based location and by matching said position with a digital street map and/or so as to determine the course of the road by receiving digital data describing the course of the road by means of Car-to-X communications.

* * * * *